UNITED STATES PATENT OFFICE.

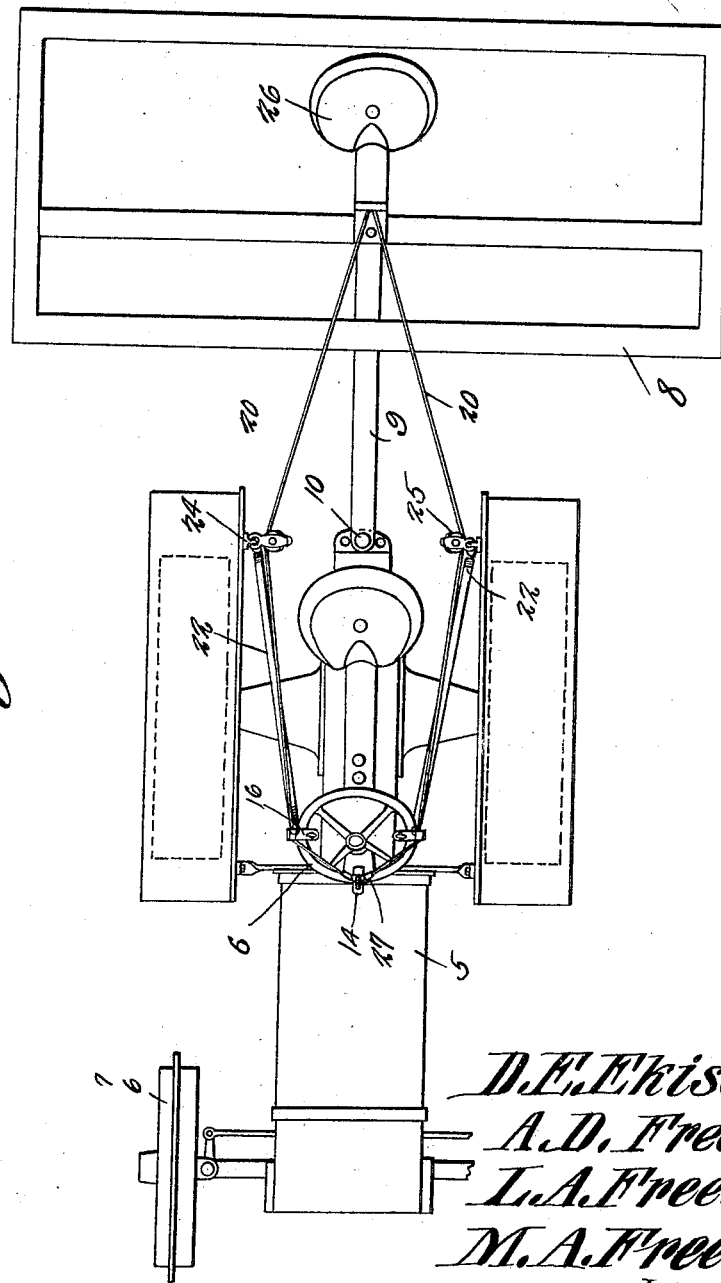

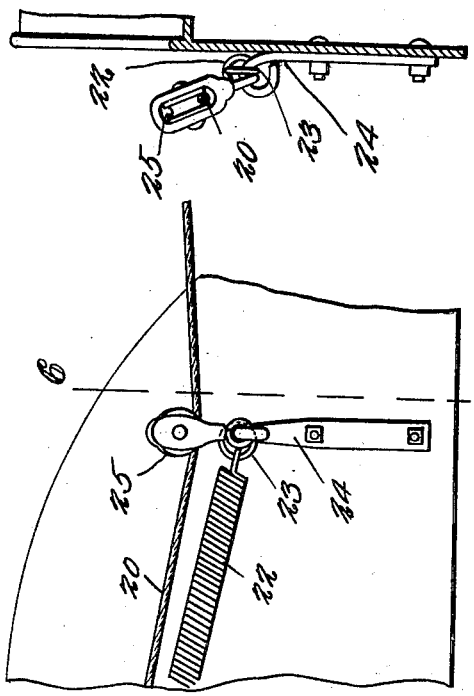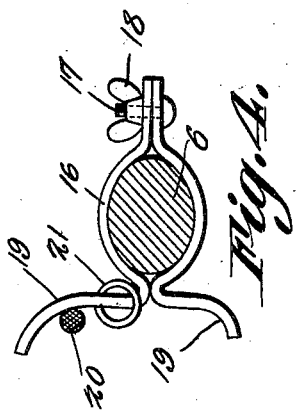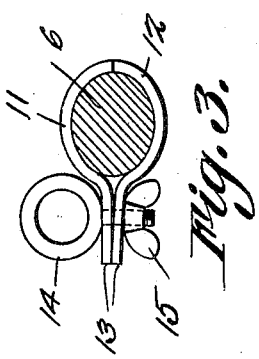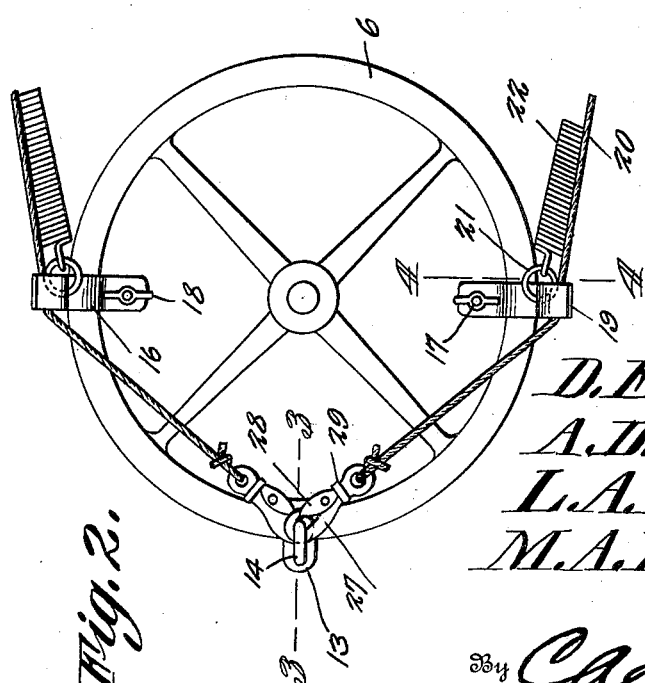

DAN ELDEN EKISS, ANTON D. FREELAND, LUBIN A. FREELAND, AND MERLIN A. FREELAND, OF BETHANY, ILLINOIS.

TRACTOR GUIDE.

1,402,851. Specification of Letters Patent. Patented Jan. 10, 1922.

Application filed June 6, 1921. Serial No. 475,522.

*To all whom it may concern:*

Be it known that we, DAN ELDEN EKISS, ANTON D. FREELAND, LUBIN A. FREELAND, and MERLIN A. FREELAND, citizens of the United States, residing at Bethany, in the county of Moultrie, State of Illinois, have invented a new and useful Tractor Guide, of which the following is a specification.

This invention relates to tractors, and more particularly to an attachment to be employed in connection with the steering mechanism of a tractor, whereby the tractor may be guided in its movements over a field from a point remote from the tractor.

The primary object of the invention is to provide novel means to permit an operator seated on an agricultural machine which is moved by the tractor, to accomplish the guiding of the tractor, thereby eliminating the necessity of providing an operator for the agricultural machine, as well as an operator for the tractor.

A further object of the invention is to provide a device of this character which may be readily and easily applied to the usual tractor construction, now in use, eliminating the necessity of altering the construction in any way.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a plan view disclosing a tractor and agricultural machine as supplied with a steering device constructed in accordance with the present invention.

Figure 2 is a plan view of a steering wheel showing the manner of attaching the steering device.

Figure 3 is an enlarged detail view of the eye bolt and its securing means taken on line 3—3 of Figure 2.

Figure 4 is an enlarged detail view of one of the guides over which the flexible members operate, taken on line 4—4 of Figure 2.

Figure 5 is an enlarged detail view disclosing a flexible member as operating through one of the guiding pulleys.

Figure 6 is a sectional view taken on line 6—6 of Figure 5.

Referring to the drawings in detail, the tractor to which the invention is applied, is indicated generally by the reference character 5, the tractor being provided with the usual steering wheel 6 that controls the movement of the front wheels 7 to guide the tractor over a field.

The reference character 8 designates an agricultural machine of any general type, the same being provided with the usual tongue 9 that has pivotal connection with the tractor as at 10, the connection being such as to permit the tractor to be guided. The device forming the essence of the invention includes a clamp formed by the opposed jaws 11 and 12, which jaws are provided with lateral extensions 13 which are apertured to accommodate the eye bolt 14 which is held in position as by means of the wing nut 15. It will thus be seen that due to this construction, the jaws 11 and 12 may be clamped around a steering wheel to secure the eye bolts 14 thereto.

The guide members which are also secured to the steering wheel at opposite sides thereof, are formed of pairs of jaws 16, which jaws are secured around the steering wheel by means of the bolt 17 and the nut 18. Each of these jaws includes an extension 19, the extensions being curved outwardly to prevent the flexible member 20 which operates over the guiding members from slipping from the guiding members.

Supported on the extension of the upper section is a ring 21, which ring receives one end of the coiled spring 22 associated therewith, the opposite end of the coiled springs being secured to the body or stationary portion of the tractor as by means of the ring 23, which is positioned over the hook member 24. Associated with each hook member 24 is a hood 25 over which operates the flexible member 20, the intermediate portion of the flexible member being secured at a point adjacent to the seat 26 of the agricultural machine, whereby the operator may have easy access thereto, to accomplish the steering of the tractor.

Secured to each end of the flexible member 20 is a hook 27, which hook is provided with a pivoted locking element 28 that is secured in a locked position by means of the ring member 29 operating thereover, and as shown these hook members have connection with the eye bolt 14 so that movement of the flexible member 20 will result in a relative rotary movement of the steering wheel to which the device is applied.

In the operation of the device, a person seated on the seat 26, may by pulling on one side of the flexible member 20, rotate the steering wheel 6 in one direction, at the same time placing the spring member 22 disposed at the opposite side of the steering wheel under tension. When the tractor has been guided in the proper direction, the spring under tension retracts to move the steering wheel to its normal position.

Having thus described the invention, what is claimed as new is:—

1. In combination with a steering wheel, an eye bolt secured to the steering wheel, guiding members secured to opposite sides of the steering wheel, a flexible member having connection with the eye bolt and operating over the guiding members, and coiled springs having connection with the steering wheel for returning the steering wheel to its normal position.

2. In combination with a steering wheel, a flexible member having connection with the steering wheel, guiding members on the steering wheel, and over which the flexible member moves, pulleys for holding the intermediate portion of the flexible member to the tractor, said flexible member adapted to rotate the steering wheel, and means for returning the steering wheel to its normal position.

3. In combination with a steering wheel, a flexible member having its ends connected to the steering wheel, guiding members, each of said guiding members including opposed jaws secured to the steering wheel, each of said opposed jaws having outwardly curved extensions, said flexible member adapted to rotate the steering wheel to guide the vehicle associated therewith, and means for automatically returning the steering wheel to its normal position.

4. In combination with a steering wheel, a flexible member having hook members secured to its ends, a pair of jaws adapted to clamp the steering wheel, an eye bolt carried by the jaws and adapted to receive the hook members, guide members clamped to the steering wheel and adapted to accommodate the intermediate portion of the flexible member, and coiled springs for moving the steering wheel to its normal position.

In testimony that we claim the foregoing as our own, we have hereto affixed our signatures in the presence of two witnesses.

DAN ELDEN EKISS.
ANTON D. FREELAND.
LUBIN A. FREELAND.
MERLIN A. FREELAND.

Witnesses:
J. H. UPPENDUHL,
T. W. BOOK.